United States Patent [19]
Herman

[11] Patent Number: 5,466,042
[45] Date of Patent: Nov. 14, 1995

[54] BICYCLE SEAT POST WITH AN ADJUSTING MECHANISM

[75] Inventor: William P. Herman, Marblehead, Mass.

[73] Assignee: Hsin Lung Accessories Co. Ltd., Taipei Hsien, Taiwan

[21] Appl. No.: 209,996

[22] Filed: Mar. 11, 1994

[51] Int. Cl.⁶ ........................................................ B62J 1/00
[52] U.S. Cl. ................................. 297/215.15; 297/195.1; 411/402
[58] Field of Search ..................... 297/215.15, 215.13, 297/195.1; 403/84, 87, 391; 411/402, 410, 396; 74/553

[56] References Cited

U.S. PATENT DOCUMENTS

| | | | |
|---|---|---|---|
| 519,411 | 5/1894 | North et al. | 411/396 |
| 3,302,970 | 2/1967 | Rizzato | 297/215.15 |
| 3,891,333 | 6/1975 | Corderac'k | 297/215.15 X |
| 4,180,345 | 12/1979 | Routens | 297/215.15 X |
| 4,421,357 | 12/1983 | Shimano | 297/215.15 X |
| 4,978,167 | 12/1990 | Harvey | 297/215.13 |
| 4,983,063 | 1/1991 | Phillips | 403/87 X |
| 5,190,346 | 3/1993 | Ringle | 297/215.15 X |
| 5,226,624 | 7/1993 | Kingsbery | 297/215.15 X |
| 5,244,301 | 9/1993 | Kurke et al. | 297/215.15 X |

FOREIGN PATENT DOCUMENTS

| 892442 | 3/1962 | United Kingdom | 411/410 |
|---|---|---|---|

Primary Examiner—Kenneth J. Dorner
Assistant Examiner—Milton Nelson, Jr.
Attorney, Agent, or Firm—Andrus, Sceales, Starke & Sawall

[57] ABSTRACT

A seat post with an offset of a bicycle includes a tube member. A clamp base is attached to the tube member. A lower clamp is disposed to the clamp base. An upper clamp is disposed to the lower clamp. An adjusting mechanism includes a first bolt member and a second bolt member. The first bolt member further includes a plurality of projected ribs at its outer wall. A spur wheel having a center hole is mounted on the outer wall ribs of the first bolt member and is rotatably disposed inside the clamp base. The second bolt member is disposed opposite to the first bolt member. By this arrangement, the upper clamp member and the lower clamp member are jointly fastened to the clamp base by the first and the second bolt members and an adjustment can be made easily by the help of the spur wheel.

6 Claims, 4 Drawing Sheets

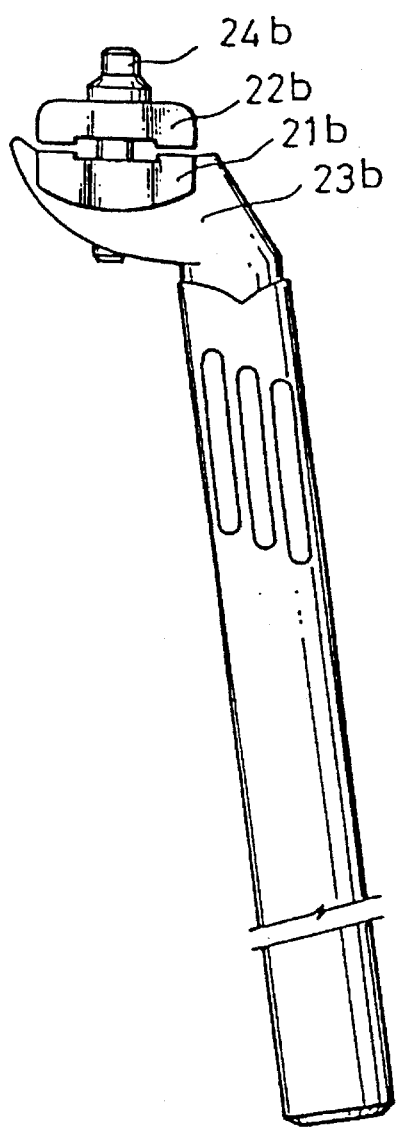
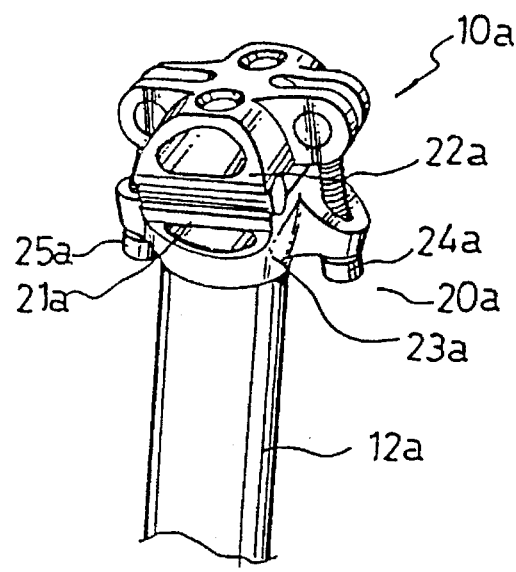
PRIOR ART
FIG. 2
PRIOR ART
FIG. 1

5,466,042

BICYCLE SEAT POST WITH AN ADJUSTING MECHANISM

BACKGROUND OF THE INVENTION

This invention relates to a adjusting mechanism, more particularly, to an adjusting mechanism for a seat post with an offset.

The seat post of a bicycle is used to support the seat of a bicycle through fastening the seat rails thereof. Furthermore, an adjustment of the seat can also be made by the help of the seat post. As shown in FIG. 1, the typical seat post 10a of a bicycle includes a clamp mechanism 20a which is fixed to a tube 12a. The clamp mechanism 20a includes a lower clamp member 21a and a upper clamp 22a wherein the upper clamp member 22a and the lower clamp member 21a can be fastened to the clamp base 23a through two bolt members 24a, 25a. By this arrangement, the seat rail of the seat can be fixed thereto. On the other hand, the lower and upper clamp 21a, 22a can jointly make an angular adjustment with respect to the clamp base 23a.

On the other hand, there is another typical seat post wherein the center line of the clamp base has an offset to the axis of the tube member, see FIG. 2. The offset of the clamp base can provide a longer distance between the seat post and the stem member of the handlebars. This design can provide at least the following advantages. 1) A larger room can be gained for the legs of a rider. 2) For the off-road riding, more tracking force can be gained since the center of the weight of a rider is closer to the rear wheel.

Although the conventional seat post, as shown in FIG. 2, with an offset has the above described advantages, they typically do not provide a secure clamping or a fine angular adjustment as with a twin bolts fixed upper clamp arrangement, see FIG. 1. This kind of seat post, as shown in FIG. 2, only has one bolt 24b to attach the upper clamp 22b to the lower clamp 21b. The lower and upper clamp 21b, 22b can not make an angular adjustment with respect to the clamp base 23b.

On the other hand, in some cases, the clamp member of the conventional seat post is inclined with the tube member. Accordingly, the adjustment of the front bolt is very difficult since the axis of the front bolt intersects with the axis of the tube member. Accordingly, the room for adjusting is very small.

SUMMARY OF THE INVENTION

The object of this invention is to provide a bicycle seat post with an adjusting mechanism, wherein the adjusting mechanism facilitates an easy adjustment of the angle of the seat, whereby the disadvantages of the prior art are completely solved.

It is still further the object of this invention wherein the adjusting mechanism includes a first bolt member which is parallel with the axis of the tube member facilitating an easy access to the bolt for an adjustment thereof. The first bolt member has a spur wheel facilitating an easy adjustment thereof.

It is still further the object of this invention wherein the adjusting mechanism includes a second bolt member wherein the axis of the second bolt member is inclined away from the axis of the tube member facilitating easy access to the bolt for an adjustment thereof.

In order to achieve the objects set forth, the seat post with an offset of a bicycle includes a tube member. A clamp base is attached to the tube member. A lower clamp is disposed to the clamp base. An upper clamp is disposed to the lower clamp member. An adjusting mechanism comprises a first bolt member and a second bolt member. The first bolt member further includes a plurality of projected ribs at the outer wall. A spur wheel having a center hole is rotatably disposed inside the clamp base. The second bolt member is disposed opposite to the first bolt member. By this arrangement, upper clamp member and the lower clamp member are jointly fastened to the clamp base by the first and the second bolt members and an adjustment can be made easily by the help of the spur wheel.

BRIEF DESCRIPTION OF THE DRAWINGS

The structural and operational characteristics of the present invention and its advantages as compared to the known state of the prior art will be-better understood from the following description, in conjunction with the attached drawings which show illustratively but not restrictively an example of a bicycle seat post with an adjusting mechanism. In the drawings:

FIG. 1 is a view of a conventional seat post with twin bolts;

FIG. 2 is a side view of a conventional seat post with an offset;

DETAILED DESCRIPTION OF A PREFERABLE EMBODIMENT

Figure 3:
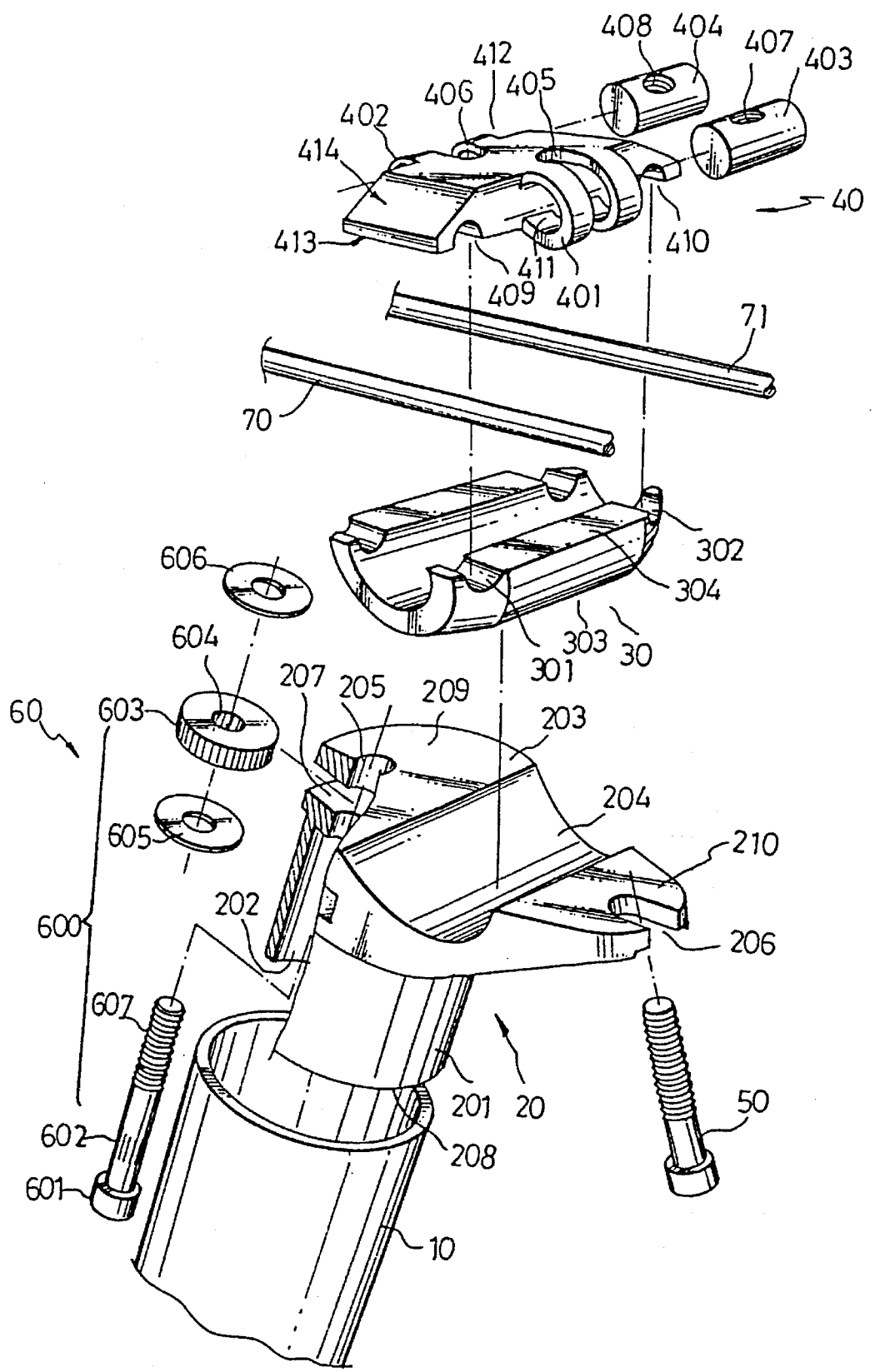
FIG. 3 is an exploded perspective view of a seat post with an adjusting mechanism made according to the invention.
Figure 4:
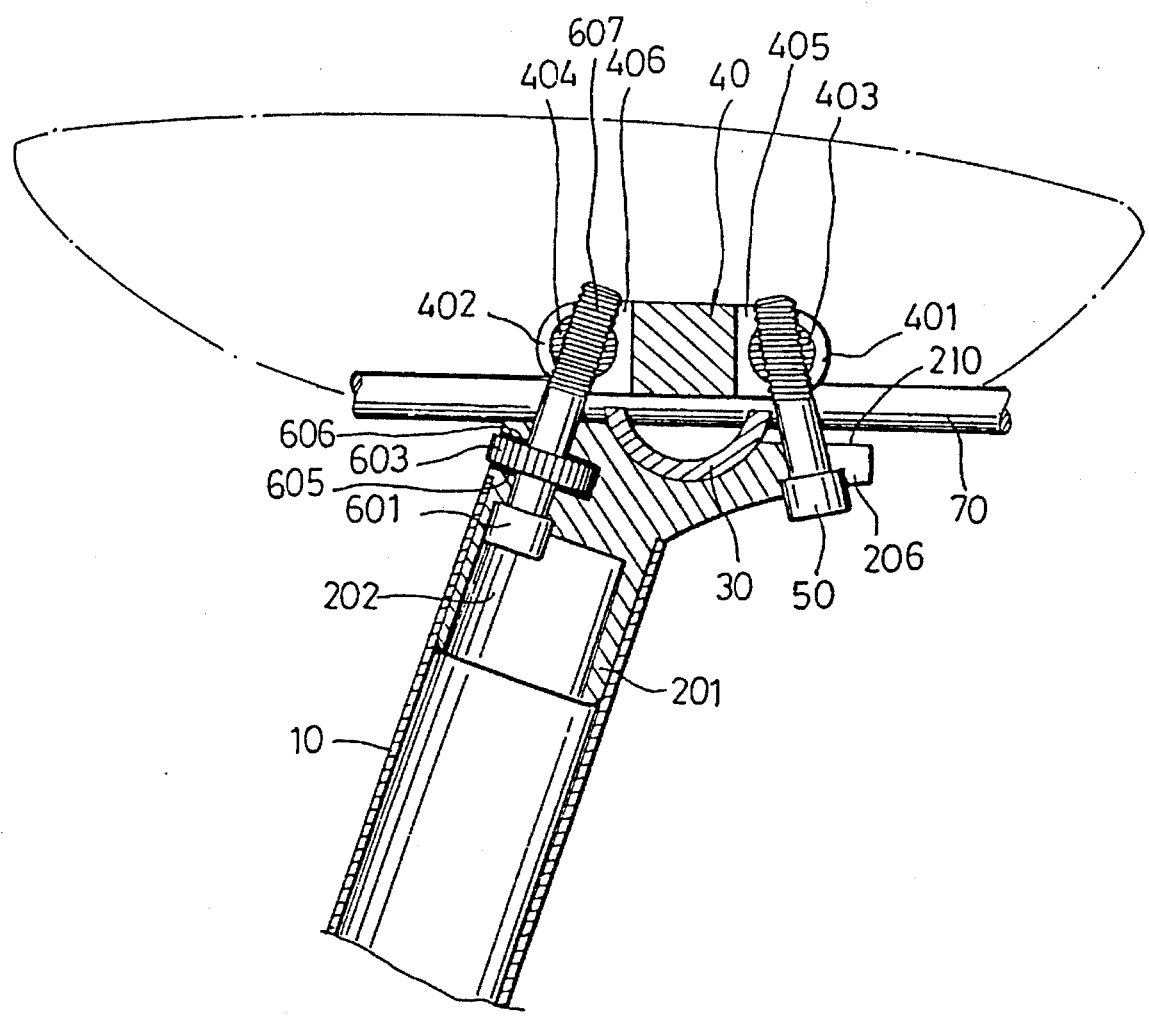
FIG. 4 is a cross-sectional view showing the seat on the seat post positioned to a first position.

Referring to FIGS. 3 and 4, the seat post with an offset of a bicycle includes a tube member 10. A clamp base 20 defines a top 203, a bottom 208, a round end 209 and an acute end 210. A flange portion 201 which can be received by the tube member 10 extends downward from the bottom of the clamp base 20. A clamp track 204 which has a round cross section is provided at the top 203 of the clamp base 20. A through hole 205 which is intercommunicated with the inside 202 of the flange portion 201 is provided at the round end 209. A chamber 207 which is intersected with the through hole 205 and parallel with the top 203 of the clamp base 20 is provided at the round end 209. A cutout 206 is defined at the acute end 210 clamp base 20.

A lower clamp 30 defines a round bottom 303 and an upper portion 304. The lower clamp 30 can be received by the clamp track 204. A pair of lower rail vise portions 301,302 are disposed at both ends of the lower clamp 30.

An upper clamp 40 defines a top 414 and a bottom 413. The upper clamp 40 further includes first and a second lug members 401,402 at both sides. Those lug members 401,402 are spaced by a pair of slots 405, 406 therebetween respectively. Two channels 411,412 are defined through those lug members 401,402 respectively. A first and a second upper clamp pivot 403, 404 are rotatably inserted into the channel 411,412 of the lug members 401, 402 of the upper clamp 40. Two threaded holes 407, 408 are provided at the center of the first and second upper clamp pivots 403, 404 respectively. A pair of upper rail vise portions 409, 410 with respect to the lower rail vise portions 301,302 are disposed at the bottom of the upper clamp 40.

An adjusting mechanism 60 includes a bolt assembly 600 and a second bolt 50 member. The bolt assembly 60 further includes a first bolt member 601 and a spur wheel 603. The spur wheel 603 having a center hole 604 is rotatably disposed inside the chamber 207. The spur wheel 603 is further sandwiched by a pair of plastic washers 605, 606 to prevent the spur wheel 603 from making contact with the inner wall of the chamber 207. The first bolt member 601 is inserted into the through hole 205 and the center hole 604 of the spur wheel 603 from the bottom of the clamp base. By the help of the projected ribs 602, the spur wheel 603 and the first bolt member 601 are engaged firmly. Then the threaded portion 607 of the first bolt member 601 is received by the threaded hole 408 of the second upper clamp pivot 404. The second bolt member 50 which can be received by the first upper clamp pivot 403 is swung in and out from the cutout 206 of the acute end of the clamp base 20 inasmuch as it is pivoted on said first upper clamp pivot 403.

By this arrangement, the seat rails 70, 71 can be retained by the upper and lower rail vise members 409, 410, 301 and 302 of the upper clamp member 40 and the lower clamp member 30.

In assembling, the second bolt member 50 can be loosened firstly; then the bolt member 50 can be swung off from the cutout 206. Then the upper clamp member 40 can be lifted from the lower clamp member 30 through the rotation of the first upper clamp pivot 403 and the second upper clamp pivot 404. Then the seat rails 70, 71 can be disposed to lower vise members 301 and 302. The upper clamp member 40 is then secured to the lower clamp member 30. The second bolt member 50 is again positioned to the cutout 206 of the clamp base 20.

In adjusting, the second bolt member 50 can be rotated by hand to a desired position. Then the first bolt member 601 can be rotated to a desired position with respect to the first bolt member 50 by the help of the spur wheel 603. When the bolt member 50 and the first bolt member 601 is secured, both bolt members 50 and 601 sustain the same torque since the lower clamp member 30 serves as a lever and is supported by the clamp track 204 of the clamp base 20.

Figure 5:
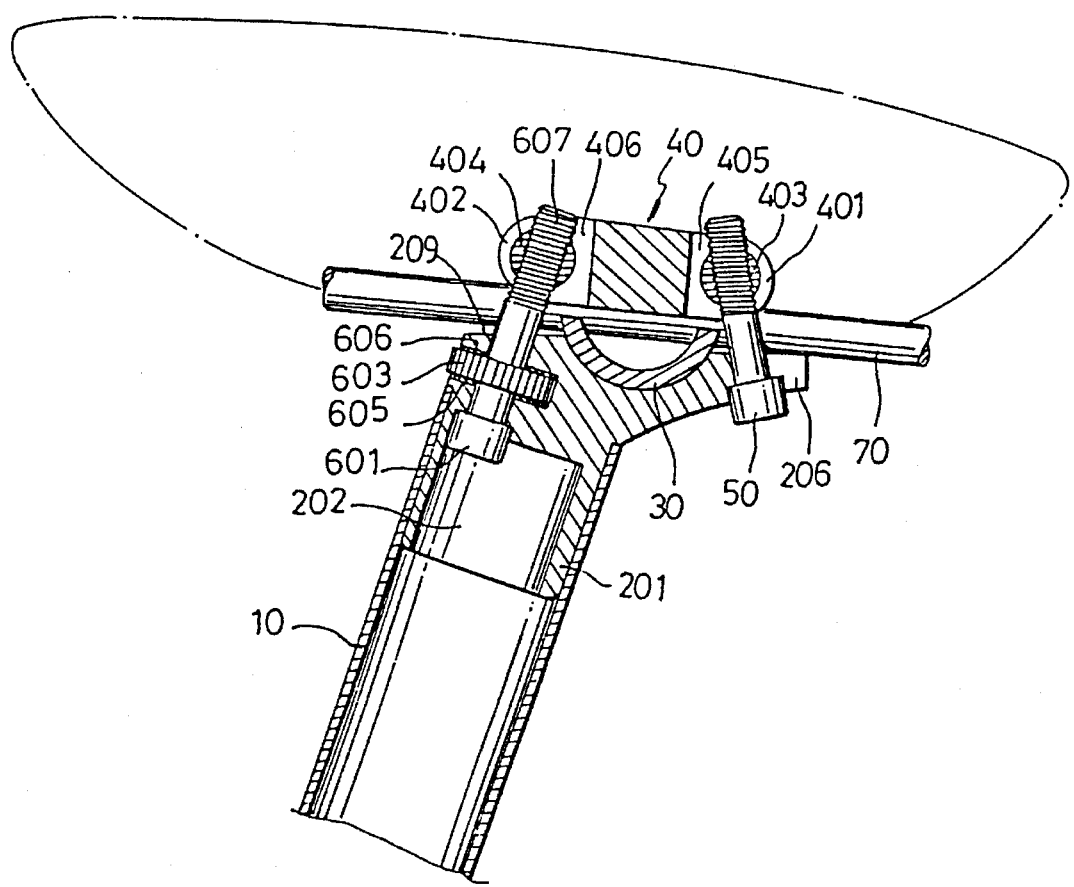
FIG. 5 is a cross-sectional showing the seat on the seat post is positioned to a second position.

It is clearly shown in the FIGS. 4 and 5 that the second bolt member 50 has been moved away from said tube 10. By this arrangement, there is a wider room for easy access to said second bolt member 50 for adjusting. In actual experiment, the second blot member 50 can be simply rotated by fingers. Meanwhile, with the provision of spur wheel 603, the first bolt member 601 can be rotated more easily than the prior art. Above all, no tool, such as a screw driver is used. The bolt members 50, 60i can be rotated manually. As a result, the adjustment can be done by the rider himself at any time, then a optimum position is achieved.

FIGS. 4 and 5 disclose the seat post is adjusted to two different positions.

Although the present invention has been described in connection with the preferred embodiments thereof, many other variations and modifications will now become apparent to those skilled in the art without departing from the scope of the invention. It is preferred, therefore, that the present invention not be limited by the specific disclosure herein, but only by the appended claims.

I claim:

1. A seat post assembly for adjustably mounting a seat of a bicycle to a frame of the bicycle, said seat post assembly comprising:

a tube member capable of being received in the frame of the bicycle so as to have an upper end and a lower end spaced along an axis of said tube member;

a clamp base having a depending, hollow, flange portion which is received in said upper end of said tube member, said clamp base having a top portion with an upwardly open, arcuately curved clamp track lying in a first axis that is transverse with respect to said axis of said tube member, said top portion of said clamp base having a generally round end lying to one side of said clamp track along a second axis that is transverse with respect to said axis of said tube member and having a generally tapered end lying to the other side of said clamp track along said second transverse axis, said clamp base having a through bore commencing inside said flange portion and extending upwardly through said clamp base to open at said round end, said clamp base having a chamber exposed to the exterior thereof and intersecting said through bore, said tapered end having a cut-out portion defined therein;

a lower clamp member having an arcuately curved bottom portion received in said clamp track for arcuate movement with respect thereto, said lower clamp member having a pair of ends each having a lower vise portion for a rail of the seat;

an upper clamp member positioned on top of said lower clamp member, said upper clamp member having a pair of ends each having an upper vise portion for the seat rails mating with a lower clamp portion, said upper clamp member having a pair of sides each having a lug member forming a channel extending along the side of the upper clamp member parallel to said first transverse axis, each of said lug members having a slot lying across to the direction of extension of said channel;

an upper clamp pivot member rotatably received in said channel of each of said lug members, each of said upper clamp pivot members having a threaded hole exposed through said slot of said lug member;

an adjustment mechanism comprising a bolt assembly and a second bolt member, said bolt assembly including a first bolt member lying in said through bore of said clamp base, said first bolt member having a threaded end portion received in the threaded hole of one of said upper clamp pivot members for pivotally retaining said upper clamp member on said lower clamp member, said first bolt member extending through and being affixed to a spur wheel lying in said chamber so that said first bolt member may be rotated by manipulating said spur wheel, said second bolt member having a threaded end portion received in the threaded hole of the other of said upper clamp pivot members, said second bolt member being received in said cut-out portion of said tapered end, said second bolt member being pivotally movable with respect to said tapered end to remove said second bolt member from said cut-out.

2. A seat post assembly as recited in claim 1 wherein said first bolt member has a plurality of projecting ribs about its circumference for forming an interference engagement with a center hole of said spur wheel.

3. A seat post assembly as recited in claim 1 wherein said chamber has a sufficient dimension in a direction parallel to said axis of said tube member to permit the free rotation of said spur wheel.

4. A seat post assembly as recited in claim 1 wherein said spur wheel has a washer on either side thereof.

5. A seat post assembly as recited in claim 1 wherein said through bore lies parallel to said axis of said tubular member.

6. A seat post assembly as recited in claim 1 wherein said second bolt member lies at an angle to said axis of said tube member when said second bolt member is received in said cut-out portion of said tapered end.

* * * * *